Figure 1:
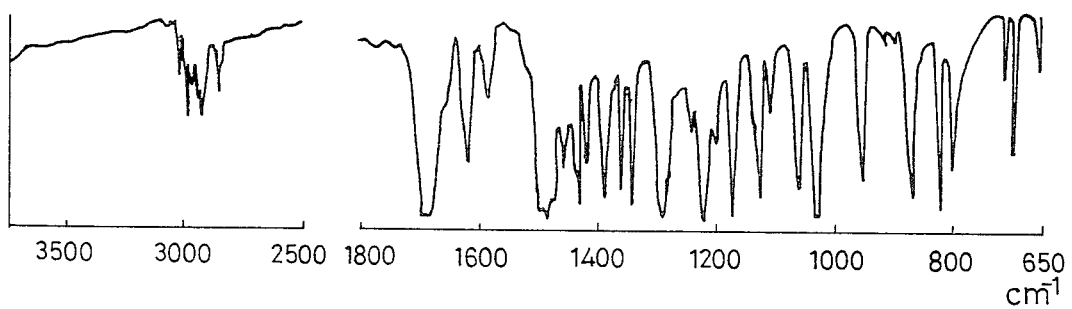

United States Patent [19]

Takahara et al.

[11] 3,944,679
[45] Mar. 16, 1976

[54] PROCESS FOR IMPARTING A COUMARIN-LIKE AROMA AND FLAVOR TO TOBACCO, FOODS AND DRINKS

[75] Inventors: Hiroyasu Takahara; Isao Morishita, both of Yokohama; Mikio Shiga; Toshikatsu Uchijima, both of Tokyo, all of Japan

[73] Assignees: The Japan Tobacco & Salt Public Corporation; Fuji Flavor Company, Limited, both of Japan

[22] Filed: Apr. 8, 1974

[21] Appl. No.: 458,686

[30] Foreign Application Priority Data
Apr. 13, 1973  Japan.................................. 48-41344
Jan. 24, 1974  Japan.................................. 49-9689

[52] U.S. Cl................................. 426/538; 131/144
[51] Int. Cl.²......................................... A23L 1/226
[58] Field of Search............. 426/65, 175, 194, 221, 426/222, 214, 193, 340, 341, 342, 356, 380, 538; 131/17 R, 144

[56] References Cited
UNITED STATES PATENTS
3,372,699  3/1968  Schumacher...................... 131/17 R
3,828,795  8/1974  Schumacher et al............. 131/17 R OTHER PUBLICATIONS
Chemicals Used in Food Processing, National Academy of Sciences, Publication 1274, 1965, p. 182.
Tobacco Flavoring for Smoking Products, Leffingwell et al., (1972) p. 22.

*Primary Examiner*—A. Louis Monacell
*Assistant Examiner*—Esther L. Massung
*Attorney, Agent, or Firm*—McGlew and Tuttle

[57] ABSTRACT

A coumarin-like aroma and flavor is imparted to tobacco, foods and drinks by adding the 2- and/or 3-alkyl-substituted indanone compound, such as, 3,4-dimethyl-7-methoxyindan-1-one and 2,4-dimethyl-7-ethoxyindan-1-one. Such a aroma and flavor is further imparted by adding an aromatic composition comprizing said indanone compound, heliotropin and the alkyllactone, such as γ-hexalactone and β,δ-dimethyl-δ-valerolactone. The favourable examples of foods and drinks in this process are oil and fat product such as margarin and shortening; dairy product such as butter, cheese and yoghurt; meat product such as ham, sausage and bacon; confectionary such as cake and candy, fermentation product such as wine and brandy; drink such as cocoa, coffee, cocacola and soft drinks.

15 Claims, 3 Drawing Figures

PROCESS FOR IMPARTING A COUMARIN-LIKE AROMA AND FLAVOR TO TOBACCO, FOODS AND DRINKS

The present invention relates to a process for imparting aroma and flavor to tobacco, foods and drinks. More particularly, the invention relates to a process for imparting aroma and flavor to tobacco, foods and drinks by adding or applying 2- and/or 3-alkyl-substituted indanone compound thereto.

The coumarin-series compounds have been widely applied as aromatics to tobacco products, oil and fat products, dairy products, confectionary, soft drinks and the like, however, such applications of these compounds have had disadvantages in that it is somewhat hazardous to the human health and expensive. Investigations have been carried out on the compounds which may impart a coumarin-like aroma and flavor to tobacco, foods or drinks and several compounds or products have already been found and marketed as being adoptable for such purpose.

We have also found that 2- and/or 3-alkyl-substituted indanone compound, which has never been known as aromatics, may impart a coumarin-like aroma and flavor to tobacco, foods and drinks, which aroma and flavor is rather superior to those imparted by the coumarin-series compounds themselves.

Accordingly, an object of the invention is to provide tobacco, foods and drinks, having a coumarin-like aroma and flavor, which is rather superior to those imparted by the coumarin-series compounds.

Another object of the invention is to provide such tobacco, foods and drinks which are less hazardous to the human health in comparison with the products using coumarin-series compounds.

A further object of the invention is to provide such tobacco, foods and drinks inexpensively in comparison with the products using the coumarin-series compounds.

Figure 2:
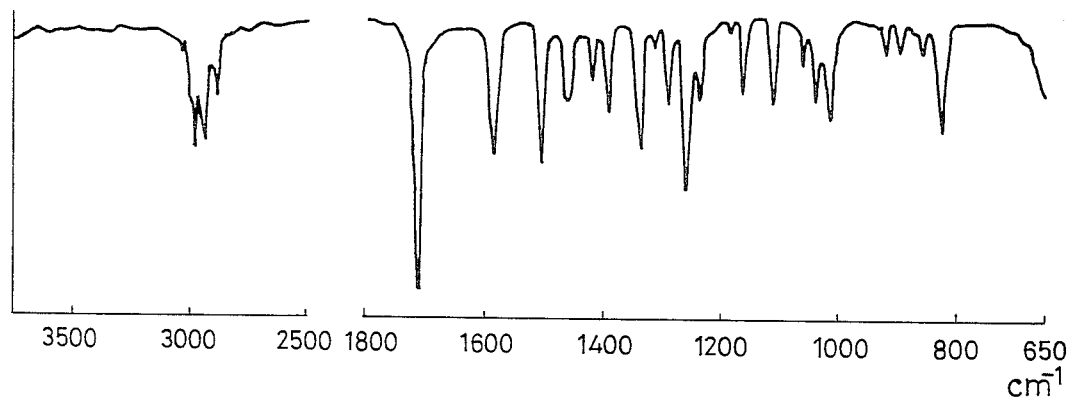
Figure 3:
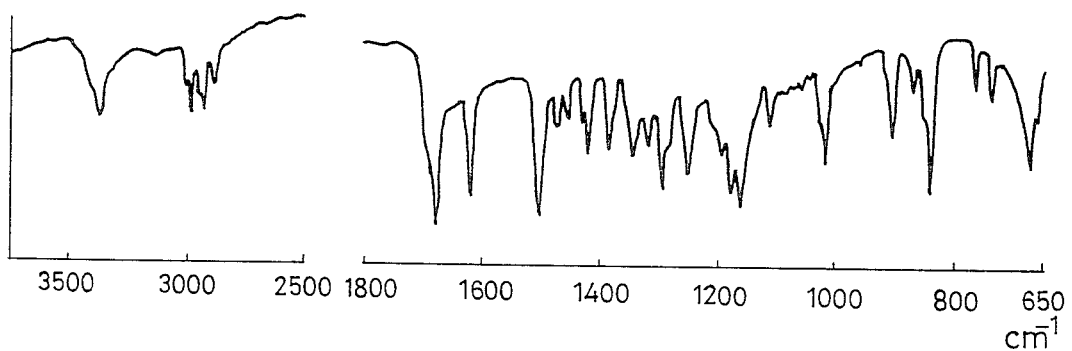

Still other objects of the invention will be understood from the following explanation of the invention in reference to the accompanying drawings, in which FIG. 1–3 show infrared spectrums of 3-methyl-4,7-dimethoxyindan-1-one, 3,4,7-trimethylindan-1-one and 3,4-dimethyl-7-hydroxyindan-1-one, respectively.

In accordance with the present invention, a coumarin-like aroma and flavor is imparted to tobacco, foods and drinks by adding thereto at least one member of the 2- and/or 3-alkyl-substituted indanone compound expressed by the general structural formula:

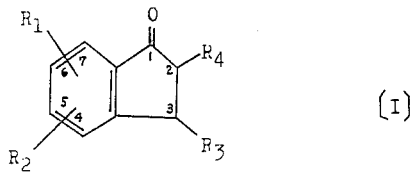

(I)

where either each of $R_1$ and $R_2$ shows $CH_3$, $C_2H_5$, $(CH_3)_2CH$, HO, $CH_3O$ or $C_2H_5O$, or $R_1$ combined with $R_2$ shows $-O-CH_2-O-$; and each of $R_3$ and $R_4$ shows H, $CH_3$, $C_2H_5$, n-$C_3H_7$ or $(CH_3)_2CH$, excepting the case that both of $R_3$ and $R_4$ show H.

In the present invention, further in order to improve aroma and flavor of tobacco, foods and drinks, is added to the same, an aromatic composition comprising the indanone compound [I], helitropin and alkyllactone expressed either by the general structural formula:

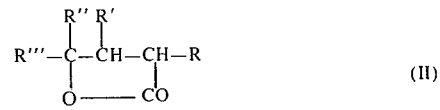

(II)

where each of R, R', R'' and R''' shows H, $CH_3$, $C_2H_5$, $C_3H_7$, $C_4H_9$, $C_5H_{11}$, $C_6H_{13}$ or $-(CH_2)_2CH=CHC_2H_5$, or by the general structural formula:

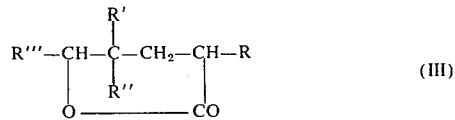

(III)

where each of R, R', R'' and R''' shows H, $CH_3$, $C_2H_5$, $C_3H_7$, $C_4H_9$, $-CH_2OCH_3$ or $-CH_2OC_2H_5$.

With respect to the application of indanone derivative as aromatics to tobacco, foods and drinks, said indanone derivative having, of course, the definition of wider scope and comprising the indanone compound [I] of the present invention, only 1,1,2,3,3-pentamethylhexahydroindanone, the chemical structure of which is however far different from those of the indanone compound [I], has hitherto been known to impart a woody and musky aroma to the said products (cf. C.A., 75(1971), 154922n, ibid, 78(1973), 12415e).

Thus, the suitable examples of the indanone compound [I] employed in the process according to the invention are 3,4-dimethyl-7-hydroxyindan-1-one, 3,4-dimethyl-7-methoxyindan-1-one, 3,4-dimethyl-7-ethoxyindan-1-one, 2,4-dimethyl-7-ethoxyindan-1-one, 2-isopropyl-4-methyl-7-hydroxyindan-1-one, 3-isopropyl-4-methyl-7-hydroxyindan-1-one, 3,4,7-trimethylindan-1-one, 2-ethyl-4,7-dimethylindan-1-one, 3-isopropyl-4,7-dimethylindan-1-one, 2-methyl-4,7-dimethoxyindan-1-one, 3-methyl-4,7-dimethoxyindan-1-one, 2-isopropyl-4,7-dimethoxyindan-1-one, 3-isopropyl-4,7-dimethoxyindan-1-one, 3-methyl-4,7-diethoxyindan-1-one, 3-isopropyl-4,7-diethoxyindan-1-one, 2-methyl-5,6-methylenedioxyindan-1-one, 3-methyl-5,6-methylenedioxyindan-1-one, 3-ethyl-5,6-methylenedioxyindan-1-one, 3-isopropyl-5,6-methylenedioxyindan-1-one, 2-methyl-4-methoxy-7-hydroxyindan-1-one, 3-isopropyl-4-methoxy-7-hydroxyindan-1-one, and the like.

The above-mentioned indanone compounds have generally a coumarin-like aroma and flavor, however, the respective characteristics of aroma and flavor thereof depend on the kind of substituted groups in the indanone nucleus, so that it is necessary to use the same properly according to the respective purposes of their usage.

Among these indanone compounds in the process of the invention 3,4,7-trimethylindan-1-one and 3,4-dimethyl-7-hydroxyindan-1-one are known from the literatures, in which however only the synthesizing processes thereof have respectively been described without any disclosures about utilization of such compounds such as aromatics (cf. J.C.S. 578(1957); J.A.C.A. 68, 1585(1956)). The other indanone compounds disclosed in the invention than the above-mentioned two compounds are all novel ones having never been described in literatures.

The indanone compound [I] employed in the process of the invention may be synthesized advantageously by condensation or condensing-cyclization reaction of the substituted benzene expressed by the general formula:

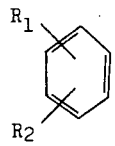

where $R_1$ and $R_2$ have the previously defined meanings, either with acrylic acid derivative of the general formula:

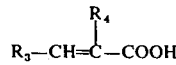

where $R_3$ and $R_4$ have the previously defined meaning, or with γ-butyrolactone derivative of the general formula:

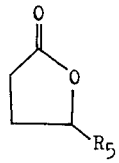

where $R_5$ has the same meaning as that of $R_3$ or $R_4$.

For example, 3-methyl-4,7-dimethoxyindan-1-one is synthesized by causing the equimolecular amounts of p-dimethoxybenzene and crotonic acid chloride to react on each other in the presence of anhydrous aluminium chloride to form corresponding unsaturated ketone, followed by adding thereto excessive anhydrous aluminium chloride to complete the cyclization reaction. The reaction mixture is, after cooling, poured into a hydrochloric acid-ice and the resultant acidic solution is stirred with chloroform. The solvent layer separated is concentrated to crystallize out the desired indanone compound, which has not so intense top note of aroma but has a coumarin-like and refreshed aroma and flavor.

Likewise, 3,4-dimethyl-7-hydroxyindan-1-one may be synthesized by causing the equimolar amounts of γ-butyrolactone and p-cresol to react on each other in a mixture of aluminium chloride and sodium chloride at a temperature of 140°–200°C, followed by pouring the reaction mixture into a hydrochloric acid-ice after having been cooled. The resultant acidic solution is either steam-distilled or stirred with benzene so as to isolate the desired indanone compound, which has a coumarin-like aroma and flavor, which aroma and flavor is markedly superior to those of various kinds of aromatics having hitherto been used as coumarin-substitutes in general.

3,4-dimethyl-7-methoxyindan-1-one, which may be formed by alkylating the OH-group of the above 3,4-dimethyl-7-hydroxyindan-1-one, has the melting point of 77°–78°C and has a slightly mild top note of aroma, which aroma is markedly coumarin-like.

The favourable examples of the alkyllactone of the formula [II] or [III] used in the process according to the invention are γ-hexalactone, γ-heptalactone, γ-octalactone, α-ethyl-γ-methyl-γ-butyrolactone, α,γ-diethyl-γ-butyrolactone, γ-methyl-γ-ethyl-γ-butyrolactone, γ-methyl-γ-isopropyl-γ-butyrolactone, γ-methyl-γ-n-hexyl-γ-butyrolactone, γ-methyl-γ-hexenyl-γ-butyrolactone, α,β,γγ-trimethyl-γ-butyrolactone, α-isopropyl-β-methyl-γ-methyl-γbutyrolactone, γ-methyl-δ-valerolactone, δ-methyl-δ-valerolactone, δ-nonalactone, δ-decalactone, δ-undecalactone, β,δ-dimethyl-δ-valerolactone, β,β,δ-trimethyl-δ-ethyl-δ-valerolacetone, α,γ-dimethyl-γ-methoxymethyl-δ-valerolactone, α,δ-dimethyl-δ-ethoxymethyl-δ-valerolactone, and the like.

According to the present process, suitable solvents and other aromatics which serve as modifiers, are employed, as in the routine manner, together with the main aromatics, the indanone compound [I]. As said solvents, propyleneglycol, aqueous glycerol solution, ethanol and the like, may be advantageously used. As said modifiers are used, for example, ethylvanillin, methyl anthranylate, eugenol, isoeugenol cinnamic aldehyde, and the like.

In general, the indanone compound [I] used in the process of the invention is so stable against the heating and the long time leaving, that the compound [I]or the aromatic composition comprising such indanone compound [I] may be added to tobacco, foods and drinks at various processing steps of the same. That is, as for tobacco, for example, the compound [I] or the aromatic composition is applicable to the tobaccos such as shredded tobacco, reconstituted tobacco, pipe tobacco, cigar tobacco, and the like. Further, the compound [I] or the aromatic composition may either be applied to cigarette paper, filter tip, packing paper, all of which are the materials for producing cigarettes, or be mixed with adhesive for cigarette paper. As for foods and drinks, the compound [I] or the aromatic composition may, for example, be added to bread, cookie or rice cracker, at the baking step thereof.

In the process of the present invention, the amount of the compound [I] or of the aromatic composition to be applied to tobacco, foods and drinks depends upon the kind, the usage and the customer's liking of such products. When the compound [I] is singly used, without heliotropin and alkyllactone, the amount thereof is 1–100 ppm by weight of the product to be treated. On the other hand, when the compound [I] is used together with heliotropin and alkyllactone, the suitable mixing proportions of the materials in such aromatic composition are as follows:

| | | |
|---|---|---|
| Indanone compound (I) | | 0.5–2.0 part |
| Heliotropin | | 0.3–0.7 part |
| Alkyllactone | | 0.5–1.2 part |
| Other aromatic (Modifier) | below | 0.1 part |
| Solvent | | 6–10 part |

That is, the proportion of the indanone compound [I] in the aromatic composition may preferably be 20–60% of the amount of all the other constitutents except the solvent. And the amount of the above aromatic composition to be added to tobacco, foods and drinks, may be 0.1–10 ppm by weight of the product.

In the present invention, the favourable examples of foods and drinks, which may be treated so as to improve aroma and flavor thereof, are oil and fat product such as margarin and shortening; dairy product such as butter, cheese and yoghurt; meat product such as ham, sausage and bacon; confectionary such as cake and candy; fermentation product such as wine and brandy;

drink such as cocoa, coffee, cocacola and soft drinks.

The following examples serve to illustrate the invention without limiting it any way:

EXAMPLE 1

10.4 g. (0.1 mol) of crotonic acid chloride is added dropwise to a mixture of 50 ml. of dried chloroform with 13.3 g. (0.1 mol) of anhydrous aluminium chloride, under ice-cooling, in the nitrogen gas stream. To the resulting mixture is added gradually 13.8 g. (0.1 mol) of p-dimethoxybenzene and the mixture is stirred for an hour. Further, to the reacted liquor is added 6.7 g. (0.05 mol) of anhydrous aluminium chloride, and the mixture is stirred for about 20 hours. The reaction mixture is then poured into a hydrochloric acid-ice and the resultant acidic solution is stirred with chloroform. The solvent layer is taken up and shaken with 1 N aqueous caustic soda solution to remove acidic substance therefrom, then washed with water and dried with anhydrous sodium sulfate. The solution is concentrated to remove chloroform and to give crude crystals, which are recrystallized from n-hexane to yield 6.6 g. of whitish crystals of 3-methyl-4,7-dimethoxyindan-1-one having the melting point of 68°–69°C.

Infrared spectrum: $\nu > C=O$, 1698 cm$^{-1}$; $\nu$—OCH$_3$ 2840 cm$^{-1}$ (cf. FIG. 1).

Elemental analysis: Calcd.: C, 69.90 %; H, 6.79 %. Found: C, 69.61 %; H, 6.90 %.

A 5% ethanol solution of 3-methyl-4,7-dimethoxyindan-1-one obtained in the above is added to the blended tobacco consisting of 85% of domestic (Japanese) leaf, 10 % of Oriental leaf and 5 % of tobacco stems, in an amount of 0.02% by weight of the tobacco, which corresponds to 10 ppm of the indanone compound. Thus treated tobacco is made into cigarettes which are compared with those made of the same kind of blended tobacco treated with coumarin of 1 ppm, by a sensory test (applying the pair test method) with respect to aroma and flavor. The test is performed by a panel consisting of 20 professional persons and the results are shown in Table 1, where numerals show the number of persons who have praised cigarette samples.

Table 1

|  | Aroma | Flavor |
|---|---|---|
| Cigarettes treated with coumarin | 11 | 10 |
| Cigarettes treated with indanone compound | 9 | 10 |

The data in Table 1 show the cigarettes treated with the indanone compound are almost equivalent in both aroma and flavor to those treated with coumarin.

EXAMPLE 2

Into a mixture of 160 ml. of dried p-xylene and 53.2 g. (0.4 mol) of anhydrous aluminium chloride is added gradually 25.8 g. (0.3 mol) of crotonic acid at a temperature of 5°–10°C, in the nitrogen gas stream, and the resulting mixture is stirred for 3 hours. The reaction mixture is poured gradually into 200 ml. of 4 N hydrochloric acid-ice, and the xylene layer in the resultant acidic solution is separated and further the aqueous layer is shaken twice with benzene. The xylene layer incorporated with benzene layers is washed with water, and thereafter shaken thrice with aqueous caustic soda solution. The incorporated aqueous layers are washed with benzene, and acidified with hydrochloric acid to crystallize out whitish crystals of β-(2,5-dimethylphenyl) butyric acid. The crystals are filtered, washed with water and dried under a reduced pressure to yield 43.2 g. of the refined ones.

Forty grams of crystals of said β-(2,5-dimethylphenyl)butyric acid is added gradually into polyphosphoric acid which has been made from 306 g. of phosphorus pentaoxide and 195 ml. of phosphoric acid, while stirring, at a temperature of 5°–10° C, in the nitrogen gas stream, and the mixture is further stirred at a temperature of 65°–75°C for 2 hours. After cooling, the reaction mixture is poured gradually into a ice-water, and the resultant mixture is shaken with benzene. The benzene layer is taken up and shaken with a 10% aqueous caustic soda solution to remove non-reacting carboxylic acid, further washed with water and dried with anhydrous sodium sulfate. The solvent is removed by distillation, and the residue is further subjected to vacuum distillation, whereby 30.8 g. of 3,4,7-trimethylindan-1-one is distilled out at 98°–100°C/3.5mmHg.

Infrared spectrum: $\nu > C=O$, 1710 cm$^{-1}$ (cf. FIG. 2).

Elemental analysis: Calcd.: C, 82.76 %; H, 8.04 %. Found: C, 82.27 %; H, 8.21 %.

Likewise, a mixture of 21.6 g. (0.2 mol) of p-cresol and 17.2 g. (0.2 mol) of γ-butyrolactone is added into a mixture of 79.8 g. (0.6 mol) of anhydrous aluminium chloride and 15.0 g. (0.26 mol) of sodium chloride which mixture has been molten at 140°C, and the resultant mixture is heated at a temperature of 140°–200°C for about 3 minutes. After cooling, the reaction mixture is poured into a hydrochloric acid-ice and the resulting acidic solution is stirred with benzene. The benzene layer is taken up and dried with anhydrous sodium sulfate. The solvent is removed by distillation, and the residue is further subjected to vacuum distillation, whereby yellowish liquid is distilled out at 95°–105°C/2mmHg, which liquid is solidified on cooling. Upon recrystallization from n-hexane after decolorization with active carbon, 14.9 g. of whitish-purple crystals of 3,4-dimethyl-7-hydroxyindan-1-one having a melting point of 52°–53°C is obtained.

Infrared spectrum: $\nu > C=O$, 1675 cm$^{-1}$; $\nu$ —OH, 3375 cm$^{-1}$ (cf. FIG. 3).

Elemental analysis: Calcd.: C, 75.00 %; H, 6.82 %. Found: C, 74.85 %; H, 6.94 %.

3,4,7-Trimethylindan-1-one and 3,4-dimethyl-7-hydroxyindan-1-one both of which are obtained in the above are mixed in the ratio 1:10, and a 5 % ethanol solution of this mixture is added to the blended tobacco consisting of 40 % of Burley leaf, 35 % of Bright Yellow leaf and 25 % of domestic (Japanese) leaf, in an amount of 0.02 % of the tobacco. Thus treated tobacco is prepared into cigarettes and submitted to a sensory test in the same way as described in Example 1. The results are shown in Table 2, the data of which show that the cigarettes treated with the indanone compounds are almost equivalent to those treated with coumarin, in aroma and flavor.

Table 2

|  | Aroma | Flavor |
|---|---|---|
| Cigarettes treated with coumarin | 11 | 9 |
| Cigarettes treated with indanone compounds | 9 | 11 |

EXAMPLE 3

2-Methyl-5,6-methylenedioxyindan-1-one is added to shredded tobacco stems in an amount of 50 ppm by weight of the stems, and cigarettes are compared with the same kind of tobacco stems treated with coumarin of 5 ppm, by a sensor test carried out in the same way as in Example 1. The results are shown in Table 3, which shows that the cigarettes treated with the indanone compound are not inferior to those treated with coumarin, in aroma and flavor.

Table 3

|  | Aroma | Flavor |
| --- | --- | --- |
| Cigarettes treated with coumarin | 11 | 10 |
| Cigarettes treated with indanone compound | 9 | 10 |

EXAMPLE 4

2-Methyl-4,7-dimethoxyindan-1-one synthesized in the similar way to that of Example 1 is added to acetate filter plugs in an amount of 50 ppm by weight of the plugs, which plugs are then attached to the cigarettes made of the shredded tobacco for marketed cigarettes "Echo". Aroma and flavor of these cigarettes are compared with those of the cigarettes with the filter plugs treated with coumarin of 5 ppm, by a sensory test. The results are shown in Table 3, which indicates that there is no difference between both the products using the present indanone compound and coumarin, respectively.

Table 4

|  | Aroma | Flavor |
| --- | --- | --- |
| Cigarettes treated with coumarin | 10 | 10 |
| Cigarettes treated with indanone compound | 10 | 10 |

EXAMPLE 5

| 3,4-Dimethyl-7-hydroxyindan-1-one | 1.0 | part |
| --- | --- | --- |
| 3,4,7-Trimethylindan-1-one | 0.2 | part |
| Heliotropin | 0.6 | part |
| γ-Hexalactone | 0.4 | part |
| γ-Heptalactone | 0.2 | part |
| γ-Octalactone | 0.4 | part |
| δ-Decalactone (1 %) | 1.5 | part |
| Propyleneglycol | 7.2 | part |

The aromatic composition consisting of the above-mentioned constituents is added in an amount of 1 ppm, to the blended tobacco consisting of 80 % of domestic (Japanese) leaf, 15 % of Orient leaf and 5 % of tobacco stems.

On the other hand, the mixture (in the ratio 5:1) of 3,4-dimethyl-7-hydroxyindan-1-one and 3,4,7-trimethylindan-1-one, both of which have been used in the above-described aromatic composition, is dissolved in ethanol in an amount of 5 %, and the solution is added to the blended tobacco in an amount to provide a tobacco containing 10 ppm by weight of said mixture of the indanone compounds.

The above two kinds of treated blended tobacco are prepared into cigarettes, respectively, which cigarettes are compared with those prepared from the blended tobacco but treated with coumarin and the coumarin substitute (A), respectively, each of an amount of 1 ppm thereof, said coumarin substitute (A) being made by Givaudan Dübendorf A.G. and marketed with the trade name "Coumarin Substitute 85505". the results of the sensory test are shown in Table 5, which shows that the cigarettes treated with the aromatic composition as well as the mixture of the indanone compounds are almost equal to those treated with coumarin and markedly superior to those treated with the conventional coumarin substitutent (A), in aroma and flavor.

Table 5

|  | Aroma | Flavor |
| --- | --- | --- |
| Cigarettes treated with coumarin | 6 | 6 |
| Cigarettes treated with coumarin substitute (A) | 3 | 2 |
| Cigarettes treated with indanone compounds | 5 | 5 |
| Cigarettes treated with aromatic composition | 6 | 7 |

EXAMPLE 6

| 2,4-Dimethyl-7-hydroxyindan-1-one | 1.0 | part |
| --- | --- | --- |
| 3,477-Trimethylindan-1-one | 0.2 | part |
| Heliotropin | 0.4 | part |
| γ-Hexalactone | 0.2 | part |
| γHeptalactone | 0.1 | part |
| γOctalactone | 0.1 | part |
| δ-Nonalactone | 0.2 | part |
| δ-Decalactone (1 %) | 1.5 | part |
| Ethylvanillin | 0.002 | part |
| Propyleneglycol | 7.8 | part |

The aromatic composition consisting of the above-mentioned constituents according to the present process is added in an amount of 1 ppm, to the blended tobacco consisting of 45 % of Burley leaf, 35 % of Bright Yellow leaf and 20 % of domestic (Japanese) leaf, and cigarettes are prepared therefrom. Further, the mixture (in the ratio 2:1) of the above-described 2,4-dimethyl-7-hydroxyindan-1-one and 3,4,7-trimethylindan-1-one, is dissolved in ethanol in an amount of 5 %, and the solution is added to the blended tobacco in an amount to give 10 ppm by weight of said indanone compounds mixture thereto, and such tobacco is prepared into cigarettes.

Thus prepared two kinds of cigarettes are compared with those prepared from the blended tobacco but treated with coumarin and the coumarin substitute (A), respectively, each of an amount of 1 ppm. The results of the sensory test in the following Table 6 show that the cigarettes treated with the mixture of the indanone compounds as well as the aromatic composition are equivalent to those treated with coumarin, in aroma and flavor.

Table 6

|  | Aroma | Flavor |
| --- | --- | --- |
| Cigarettes treated with coumarin | 7 | 5 |
| Cigarettes treated with coumarin substitute (A) | 2 | 2 |
| Cigarettes treated with indanone compounds | 5 | 6 |
| Cigarettes treated with aromatic composition | 6 | 7 |

EXAMPLE 7

| 2-Methyl-5,6-methylenedioxyindan-1-one | 1.0 | part |
| --- | --- | --- |
| 3,4-Dimethyl-7-hydroxyindan-1-one | 0.5 | part |
| Heliotropin | 0.6 | part |
| γ-Hexalactone | 0.4 | part |
| γ-Heptalactone | 0.2 | part |
| α-Ethyl-δ-methyl-δ-butyrolactone | 0.4 | part |

-continued

| | | |
|---|---|---|
| δ-Decalactone (1 %) | 1.5 | part |
| Methylanthranylate (1 %) | 0.1 | part |
| Propyleneglycol | 7.1 | part |

The above-described aromatic composition according to the present process is added in an amount of 1 ppm to the materials of cookies, and this materials are baked to form cookies. Likewise, the mixture (in the ratio 2:1) of 2-methyl-5,6-methylenedioxyindan-1-one and 3,4-dimethyl-7-hydroxyindan-1-one is dissolved in ethanol in an amount of 5 %, and the solution is added to the materials of cookies in an amount to give 10 ppm by weight of said indanone compounds mixture to the materials of cookies, and the materials are baked.

These cookies are compared with those treated with coumarin and the coumarin substitute (B), respectively, each of an amount of 1 ppm, said coumarin substitute (B) being made by Fritzsche Dodge & Olcott (Japan) Ltd. and marketed with the trade name "Coumarin Replacement No. 23219". The results of the sensory test in Table 7 show that the product treated with the aromatic composition of this process is equal to that treated with coumarin, while that treated with the mixture of the indanone compounds is equal to that of the coumarin substitute (B).

Table 7

| | Aroma | Flavor |
|---|---|---|
| Cookies treated with coumarin | 5 | 6 |
| Cookies treated with coumarin substitute (B) | 4 | 3 |
| Cookies treated with indanone compounds | 4 | 4 |
| Cookies treated with aromatic composition | 6 | 7 |

EXAMPLE 8

| | | |
|---|---|---|
| 3-Methyl-4,7-dimethoxyindan-1-one | 1.0 | part |
| 3,4-Dimethyl-7-hydroxyindan-1-one | 0.5 | part |
| Heliotropin | 0.6 | part |
| γ-Hexalactone | 0.4 | part |
| γ-Heptalactone | 0.2 | part |
| γ-Methyl-γ-isopropyl-γ-butyrolactone | 0.4 | part |
| δ-Decalactone (1 %) | 1.5 | part |
| Propyleneglycol | 7.5 | part |

The above-described aromatic composition of the present process is added in an amount of 1 ppm to the material meat of sausages, and this material meat is smoked to make sausges. Likewise, the mixture (in the ratio 2:1) of 3-methyl-4,7-dimethoxyindan-1-one and 3,4-dimethyl-7-hydroxindan-1-one is dissolved in ethanol in an amount of 5 %, and the solution is added to the material meat but in an amount to give 10 ppm by weight of said indanone compounds mixture thereto, and the material is smoked.

Thus obtained sausages are compared with those treated with coumarin and the coumarin substitute (B), respectively, each of an amount of 1 ppm. The results of the sensory test in Table 8 show that the sausages treated by the present process are almost equal to those treated with coumarin and superior to those of the coumarin substitute (B).

Table 8

| | Aroma | Flavor |
|---|---|---|
| Sausages treated with coumarin | 6 | 6 |
| Sausages treated with coumarin substitute (B) | 2 | 3 |
| Sausages treated with indanone compounds | 5 | 5 |
| Sausages treated with aromatic composition | 7 | 6 |

EXAMPLE 9

| | | |
|---|---|---|
| 3-Ethyl-5,6-methylenedioxyindan-1-one | 1.0 | part |
| 3,4-Dimethyl-7-methoxyindan-1-one | 0.7 | part |
| Heliotropin | 0.6 | part |
| γ-Hexalactone | 0.4 | part |
| γ-Heptalactone | 0.2 | part |
| α-Methyl-β-methyl-γ-methyl-γ-butyrolactone | 0.2 | part |
| δ-Decalactone (1 %) | 1.5 | part |
| Ethylvanillin | 0.002 | part |
| Propyleneglycol | 7.5 | part |

The above-described aromataic composition of the present process is added in an amount of 1 ppm to the material flour of cakes, and this flour is baked to make cakes. Likewise, a 5 % ethanol solution of the mixture (in the ratio 10:7) of 3-ethyl-5,6-methylenedioxyindan-1-one and 3,4-dimethyl-7-methoxyindan-1-one is added to the material flour but in an amount to give 10 ppm by weight of said indanone compounds mixture thereto, and this material is baked.

Thus made cakes are compared with those treated with coumarin and the coumarin substitute (B), respectively, each of an amount of 1 ppm. The data of the sensory test are shown in Table 9, which indicates that the cakes treated with the aromatic composition are rather superior to those treated with comarin, while the cakes treated with the mixture of the indanone compounds are superior to those treated with the coumarin substitute (B).

Table 9

| | Aroma | Flavor |
|---|---|---|
| Cakes treated with coumarin | 6 | 7 |
| Cakes treated with coumarin substitute (B) | 3 | 2 |
| Cakes treated with indanone compounds | 4 | 4 |
| Cakes treated with Aromatic composition | 7 | 7 |

EXAMPLE 10

| | | |
|---|---|---|
| 2-Isopropyl-4-methyl-7-hydroxyinaan-1-one | 0.6 | part |
| 3,4-Dimethyl-7-methoxyindan-one-1-one | 0.6 | part |
| Heliotropin | 0.6 | part |
| γ-Hexalactone | 0.3 | part |
| γ-Heptalactone | 0.2 | part |
| β,β,δ-Trimethyl-δ-ethyl-δ-valerolactone | 0.2 | part |
| δ-Decalactone (1 %) | 1.5 | part |
| Ethylvanillin | 0.002 | part |
| Propyleneglycol | 7.6 | part |

The above-described aromatic composition according to the present process is added in an amount of 1 ppm to the materials of candies, and candies are prepared therefrom. A 5 % ethanol solution of the mixture (in the ratio 1:1) of 2-isopropyl-4-methyl-7-hydroxyindan-1-one and 3,4-dimethyl-7-methoxyindan-1-one is added to the materials but in an amount to give 10 ppm by weight of said indanone compounds mixture thereto, and candies are prepared therefrom.

Thus made candies are compared with those treated with coumarin and the coumarin substitute (B), respectively, each of an amount of 1 ppm. The results of the sensory test shown in Table 10 indicate that the candies treated with aromatic composition are equivalent to those treated with coumarin, while those treated with the mixture of the indanone compounds are superior to those treated with the coumarin substitute (B).

Table 10

|  | Aroma | Flavor |
|---|---|---|
| Candies treated with coumarin | 7 | 7 |
| Candies treated with coumarin substitute (B) | 2 | 3 |
| Candies treated with indanone compounds | 4 | 4 |
| Candies treated with aromatic composition | 7 | 6 |

EXAMPLE 11

| | | |
|---|---|---|
| 3-Isopropyl-4-ethyl-7-hydroxyindan-1-one | 0.8 | part |
| 2-Methyl-5,6-methylenedioxyindan-1-one | 0.8 | part |
| Heliotropin | 0.5 | part |
| γ-Hexalactone | 0.4 | part |
| γ-Heptalactone | 0.2 | part |
| α-Isopropyl-β,γ-dimethyl-γ-butyrolactone | 0.2 | part |
| δ-Decalactone ( 1 % ) | 1.5 | part |
| Ethylvanillin | 0.002 | part |
| Propyleneglycol | 7.8 | part |

The above aromatic composition of the present process is added in an amount of 1 ppm to the material milk of yoghurt and the material is fermented to make yoghurt. A 5 % ethanol solution of the mixture (in the ratio 1:1) of 3-isopropyl-4-ethyl-7-hydroxyindan-1-one and 2-methyl-5,6-methylenedioxyindan-1-one is added to the material milk but in an amount to give 10 ppm by weight of said indanone compounds mixture thereto, and yoghurt is prepared therefrom.

Thus made yoghurt is compared with those treated with coumarin and the coumarin substitute (B), respectively, each of an amount of 1 ppm. The results of the sensory test in Table 11 show that the yoghurt treated with the aromatic composition is superior to that treated with coumarin, while that treated with the mixture of the indanone compounds is superior to that treated with the coumarin substitute (B).

Table 11

|  | Aroma | Flavor |
|---|---|---|
| Yoghurt treated with coumarin | 6 | 7 |
| Yoghurt treated with coumarin substitute (B) | 2 | 1 |
| Yoghurt treated with indanone compounds | 4 | 5 |
| Yoghurt treated with aromatic composition | 8 | 7 |

EXAMPLE 12

| | | |
|---|---|---|
| 2-Ethyl-4-methyl-7-hydroxyindan-1-one | 1.2 | part |
| 3,4,7-Trimethylindan-1-one | 0.5 | part |
| Heliotropin | 0.5 | part |
| γ-Hexalactone | 0.4 | part |
| γ-Heptalactone | 0.2 | part |
| γ-Methyl-δ-valerolactone | 0.3 | part |
| δ-Decalactone ( 1 % ) | 1.3 | part |
| Propyleneglycol | 7.5 | part |

The above aromatic composition of the present process is added in an amount of 1 ppm to the material plan oil of margarin, and margarin is prepared therefrom. A 5 % ethanol solution of the mixture (in the ratio 12:5) of 2-ethyl-4-methyl-7-hydroxyindan-1-one and 3,4,7-trimethylindan-1-one is added to the material oil in an amount to give 10 ppm by weight of said indanone compounds mixture thereto, and margarin is prepared therefrom.

Thus made two kinds of margarin are compared with those treated with coumarin and the coumarin substitute (B), respectively, each of an amount of 1 ppm. The data of the sensory test obtained are shown in Table 12, which shows that the margarin treated with the aromatic composition of the present process is superior to that treated with coumarin, while the product treated with the mixture of the indanone compounds is superior to that treated with the coumarin substitute (B).

Table 12

|  | Aroma | Flavor |
|---|---|---|
| Margarin treated with coumarin | 7 | 6 |
| Margarin treated with coumarin substitute (B) | 3 | 2 |
| Margarin treated with indanone compounds | 4 | 4 |
| Margarin treated with aromatic composition | 6 | 8 |

| | | |
|---|---|---|
| 2-Ethyl-4-methyl-7-hydroxyindan-1-one | 1.0 | part |
| 3-Methyl-4,7-dimethoxyindan-1-one | 0.5 | part |
| Heliotropin | 0.4 | part |
| γ-Hexalactone | 0.4 | part |
| γ-Heptalactone | 0.2 | part |
| β,δ-Dimethyl-δ-valerolactone | 0.3 | part |
| δ-Decalactone ( 1 % ) | 1.0 | part |
| Ethylvanillin | 0.003 | part |
| Propyleneglycol | 8.2 | part | the above aromatic composition of the present process is added to citron drink in an amount of 1.5 ppm, while a mixture of 2-ethyl-4-methyl-7-hydroxyindan-1-one and 3-methyl-4,7-dimethoxyindan-1-one in the ratio 2:1 is added to the citron drink in an amount of 10 ppm. These drinks are compared with those treated with coumarin and the coumarin substitute (B), respectively, each of an amount of 1 ppm. The data in Table 13 show that the product treated with the aromatic composition of this invention is equal to coumarin added product, while the product treated with the mixture of indanone compounds of this invention is superior to the coumarin substitute (B) added products.

Table 13

|  | Aroma | Flavor |
|---|---|---|
| Citron treated with coumarin | 7 | 8 |
| Citron treated with coumarin substitute (B) | 2 | 2 |
| Citron treated with indanone compounds | 4 | 4 |
| Citron treated with aromatic composition | 7 | 6 |

| | | |
|---|---|---|
| 3-Isopropyl-4-methoxy-7-hydroxyindan-1-one | 1.0 | part |
| 3-Methyl-5,6-methylenedioxyindan-1-one | 0.5 | part |
| Heliotropin | 0.5 | part |
| γ-Hexalactone | 0.5 | part |
| γ-Heptalactone | 0.4 | part |
| α-Isopropyl-β,γ-dimethyl-γ-butyrolacetone | 0.2 | part |
| δ-Decalactone ( 1 % ) | 1.5 | part |
| Ethylvanillin | 0.002 | part |
| Propyleneglycol | 8.0 | part |

The above aromatic composition of the present invention is added to coffee in an amount of 1.2 ppm by dry weight of coffee. A mixture of 3-isopropyl-4-methoxy-7-hydroxyindan-1-one and 3-methyl-5,6-methylenedioxyindan-1-one in the ratio 2:1 is added to the coffee in an amount of 10 ppm. The above two kinds of coffee are compared with those treated with coumarin and coumarin substituted (B), respectively, each of an amount of 1 ppm. The data in Table 14 show that the products treated by the present process are almost equal to that treated with coumarin.

Table 14

|  | Aroma | Flavor |
|---|---|---|
| Coffee treated with coumarin | 6 | 6 |
| Coffee treated with coumarin substitute (B) | 1 | 3 |
| Coffee treated with indanone compounds | 5 | 4 |
| Coffee treated with aromatic composition | 8 | 7 |

What we claim is:

1. Process for imparting a coumarin-like aroma and flavor to a consumable product selected from the group consisting of tobacco, food and drink, which comprises adding to said product at least one 2- and/or 3-alkyl-substituted indanone compound having the general structural formula:

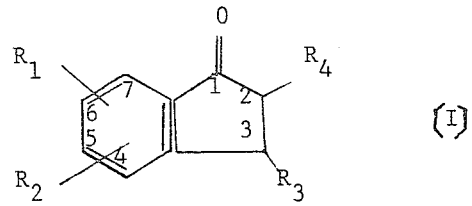

where either each of $R_1$ and $R_2$ represents $CH_3-$, $C_2H_5-$, $(CH_3)_2CH-$, $HO-$, $CH_3O-$ or $C_2H_5O-$, or $R_1$ combined with $R_2$ represents $-O-CH_2-O-$; and each of $R_3$ and $R_4$ represents H, $CH_3$, $C_2H_5$, $n-C_3H_7$ or $(CH_3)_2CH-$, excepting the case when both of $R_3$ and $R_4$ represent H.

2. Process as claimed in claim 1, wherein the 2- and/or 3-alkyl-substituted indanone compound [I] is at least one member selected from the group consisting of 3,4-dimethyl-7-hydroxyindan-1-one, 3,4-dimethyl-7-methoxyindan-1-one, 3,4-dimethyl-7-ethoxyindan-1-one, 2,4-dimethyl-7-ethoxyindan-1-one, 2-isopropyl-4-methyl-7-hydroxyindan-1-one, 3-isopropyl-4-methyl-7-hydroxyindan-1-one, 3,4,7-trimethylindan1-one, 2-ethyl-4,7-dimethylindan-1-one, 3-isopropyl-4,7-dimethylindan-1-one, 2-methyl-4-, 7-dimethoxyindan-1-one, 3-methyl-4, 7-dimethoxyindan-1-one, 2-isopropyl-4,7-dimethoxyindan-1-one, 3-isopropyl-4,7-dimethoxyindan-1-one,3-methyl-4,7diethoxyindan-1-one, 3-isopropyl-4,7-diethoxyindan-1-one, 2-methyl-5,6-methylenedioxindan-1-one, 3-methyl-5,6-methylenedioxyindan-1-one, 3-ethyl-5,6-methylenedioxyindan-1-one, 3-isopropyl-5,6-methylenedioxyndan-1-one, 2-methyl-4-methoxy-7-hydroxyindan-1-one and 3-isopropyl-4-methoxy-7-hydroxyindan-1-one.

3. Process as claimed in claim 1, wherein the 2- and/or 3-alkyl-substituted indanone compound [I] is added to consumable product in an amount of about 1 to about 100 ppm by weight of said product.

4. Process as claimed in claim 1, wherein the 2- and/or 3-alkyl-substituted indanone compound [I] is dissolved in at least one solvent selected from the group consisting of propylene glycol, aqueous glycerol solution and ethanol.

5. Process as claimed in claim 1, wherein at least one modifier selected from the group consisting of ethyl vanillin, methyl anthranylate, eugenol, isoeugenol and cinnamic aldehyde, is used together with the said indanone compound [I].

6. Process as claimed in claim 1, wherein the consumable product is selected from the group consisting of margarin, shortening, butter, cheese, yoghurt, ham, sausage, bacon, cake, candy, wine, brandy, cocoa, coffee, and soft drinks.

7. Process as claimed in claim 1, wherein the 2- and/or 3-alkyl-substituted indanone compound [I] is applied to at least one product selected from shredded tobacco, re-constituted tobacco, pipe tobacco and/or cigar tobacco.

8. Process as claimed in claim 1, wherein to said consumable product are added together with the said 2- and/or 3-alkyl-substituted indanone compound [I], heliotropin and alkyllactone expressed either by the general structural formula:

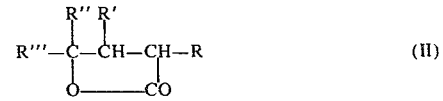

wherein each of R, R', R'' and R''' shows H, $CH_3$, $C_2H_5$, $C_3H_7$, $C_4H_9$, $C_5H_{11}$, $C_6H_{13}$, or $-(CH_2)_2CH=CHC_2H_5$, or by the general structural formula:

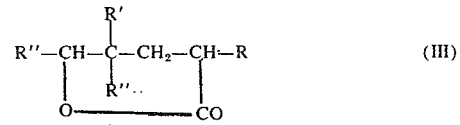

where each of R, R', R'' and R''' shows H, $CH_3$, $C_2H_5$, $C_3H_7$, $C_4H_9$, $-CH_2OCH_3$ or $-CH_2OC_2H_5$.

9. Process as claimed in claim 8, wherein the 2- and/or 3-alkyl-substituted indanone compound [I] comprises at least one member selected from the group consisting of 3,4-dimethyl-7-hydroxyindan-1-one, 3,4-dimethyl-7-methoxyindan1-one, 3,4-dimethyl-7-ethoxyindan-1-one, 2,4,-dimethyl-7-ethoxyindan-1-one, 2-isopropyl-4-methyl-7-hydroxyindan-1-one, 3-isopropyl-4-methyl-7-hydroxyindan-1-one, 3,4,7-trimethylindan-1-one, 2-ethyl-4,7-dimethylindan-1-one, 3-isopropyl-4,7-dimethylindan-1-one, 2-methyl-4,7-dimethoxyindan-1-one, 3-methyl-4, 7-dimethoxyindan-1-one, 2-isopropyl-4,7-dimethoxyindan-1-one, 3-isopropyl-4,7-dimethoxyindan-1-one, 3-methyl-4,7-diethoxyindan-1-one, 3-isopropyl-4,7-diethoxyindan-1-one, 2-methyl-5,6-methylenedioxindan-1-one, 3-methyl-5,6-methylenedioxyndan-1-one, 3-ethyl-5,6-methylenedioxyindan-1-one, 3-isopropyl-5,6-methylenedioxyindan-1-one, 2-methyl-4-methoxy-7-hydroxyindan-1-one and 3-isopropyl-4-methoxy-7-hydroxyindan-1-one.

10. Process as claimed in claim 8, wherein said akyllactone [II] or [III] comprises at least one member selected from the group consisting of γ hexalactone, γ-heptalactone, γ-octalactone, α-ethyl-γ-methyl-γ-butyrolactone, α, γ-diethyl-γ-butyroloactone, γ-methyl-γ-ethyl-γ-butyrolactone, γ-methyl-γ-isopropyl-γ-butyrolactone, γ-methyl-γ-n-hexyl-γ-butyrolactone, γ-methyl-γ-hexenyl-γ-butyrolactone, α, β, γ-trimethyl-γ-butyrolactone, α-isopropyl-β-methyl-γ-methyl-γ-butyrolactone, γ-methyl-δ-valerolactone, δ-methyl-δ-valerolactone δ-nonaclactone, δ-decalactone, δ-undecalactone, β,δ-dimethyl-δ-valerolactone, β,β,δ-trimethyl-δ-ethyl-δ-valerolactone, α,γ-dimethyl-γ-methoxymethyl-δ-valerolactone and α,γ-dimethyl-γ-ethoxymethyl-δ-valerolactone.

11. Process as claimed in claim 8, wherein the indanone compound [I] is dissolved in at least one solvent selected from the group consisting of ethyl vanillin, methyl anthranylate eugenol, isoeugenol and cinnamic aldehyde, and said solvent is used together with the said indanone compound [I].

12. Process as claimed in claim 8, wherein the proportions of the ingredients added together are as follows:

| | |
|---|---|
| Indanone compounds (1) | 0.5–2.0 part |
| Heliotropin | 0.3–0.7 part |
| Alkyllactone | 0.5–1.2 part |
| Other aromatics (modifier) | below 0.1 part |
| Solvent | 6–10 part | and the proportions of the indanone compound [I] is 20–60% of the amount of all the other constituents except the solvent.

13. Process as claimed in claim 1, wherein the said indanone compound [I] is added to the consumable product in an amount of about 0.1–10 ppm by weight of said product.

14. Process as claimed in claim 8, wherein said consumable product comprises one member selected from the group consisting of margarin, shortening, butter, cheese, yoghurt, ham, sausage, bacon, cake, candy, wine, brandy, cocoa, coffee, and soft drinks.

15. Process as claimed in claim 8, wherein the said indanone compound [I] is applied to shredded tobacco, re-constituted tobacco, pipe tobacco or cigar tobacco.

* * * * *